No. 757,533. PATENTED APR. 19, 1904.
W. G. WILSON.
MOTOR CAR.
APPLICATION FILED DEC. 3, 1900.
NO MODEL. 2 SHEETS—SHEET 1.
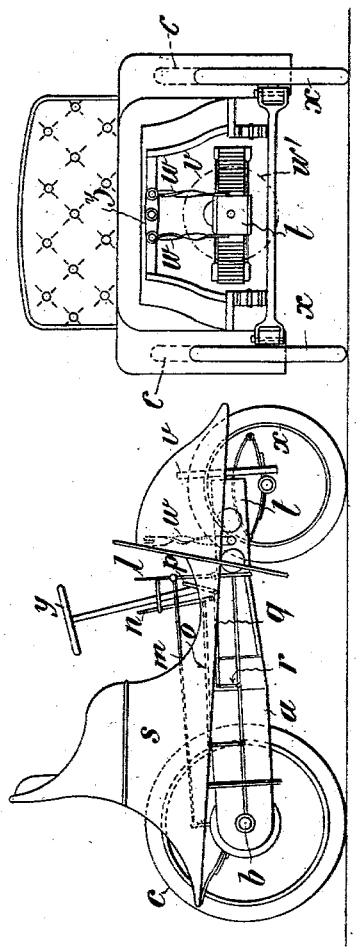
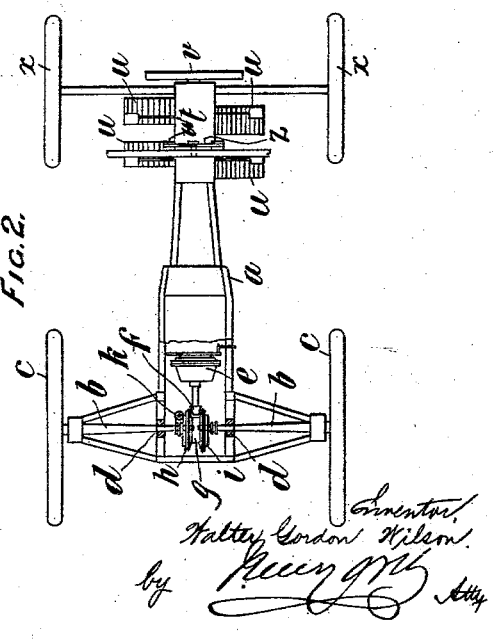

No. 757,533. PATENTED APR. 19, 1904.
W. G. WILSON.
MOTOR CAR.
APPLICATION FILED DEC. 3, 1900.
NO MODEL. 2 SHEETS—SHEET 2.
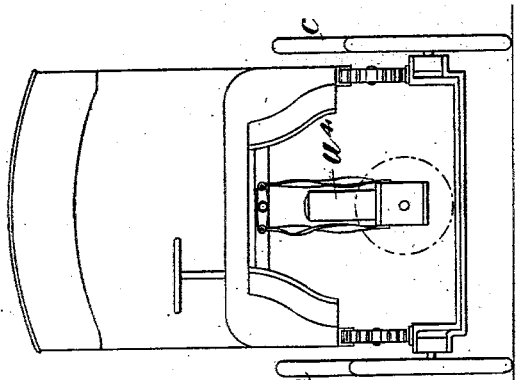
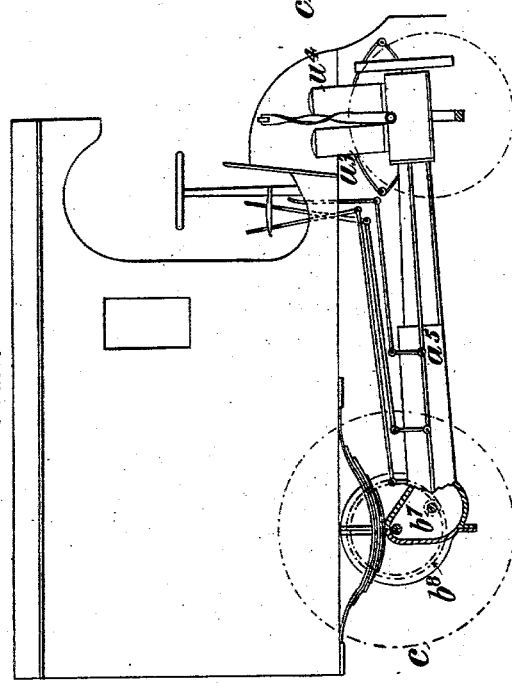
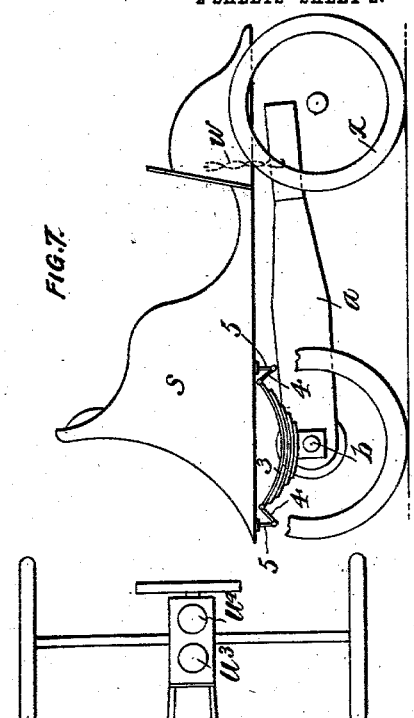
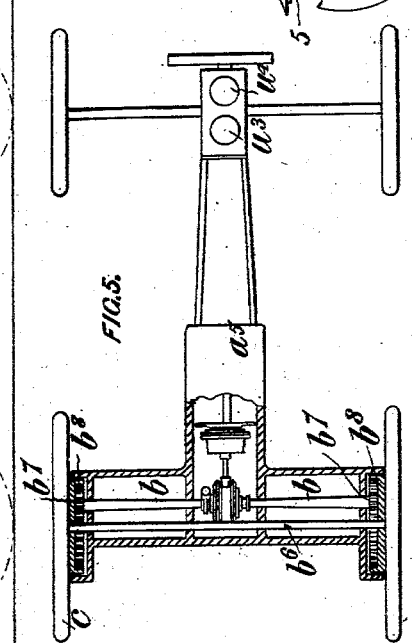

No. 757,533. Patented April 19, 1904.

UNITED STATES PATENT OFFICE.

WALTER GORDON WILSON, OF WESTMINSTER, ENGLAND.

MOTOR-CAR.

SPECIFICATION forming part of Letters Patent No. 757,533, dated April 19, 1904.

Application filed December 3, 1900. Serial No. 38,484. (No model.)

*To all whom it may concern:*

Be it known that I, WALTER GORDON WILSON, engineer, a subject of the Queen of Great Britain and Ireland, residing at 32 Great Peter street, in the city of Westminster, England, have invented new and useful Improvements in Motor-Cars, of which the following is a specification.

My invention relates to improvements in and connected with motor-cars whereby I obtain great advantages in the arrangement of the motive engine, the gear for varying the speed and the direction of motion of the car, and in the obviation of vibration and jar to the car itself, and consequently to the occupants thereof. Besides this I am enabled to construct the engine and gear in such manner that it is absolutely independent of the body of the car itself, so that the latter is not appreciably affected by sudden or vibratory movement of the motor or motor-framing, which is extremely advantageous.

Figure 1 of the accompanying drawings represents in side elevation a motor-car constructed according to my invention. Fig. 2 is a plan thereof with the car-body removed, and Fig. 3 is a front elevation of same. Fig. 4 shows in side elevation a motor-car with engines arranged vertically and suspended from the car-frame. Fig. 5 is a plan thereof. Fig. 6 is a front elevation, and Fig. 7 is a side view showing a connection between the rear end of the car-body and rear wheels' axle, enabling relative longitudinal movement of frame and body.

According to my invention and referring to Figs. 1, 2, and 3, I make a casing or frame $a$, which is, for example, somewhat in the form of the letter T, the part of which corresponding to the horizontal member of such letter contains the hind or driving road wheel axle $b$, which is suitably made in two parts and provided with well-known gear to admit of one wheel $c$ traveling at a different speed to the other while the car is running in a curve. The driving road-wheels $c\ c$ are keyed to the axle parts $b$, and the latter are supported in the framing $a$ near their outer ends next to the hubs of the wheels, while the inner ends of the said axle parts are supported in a suitable bearing or bearings $d\ d$, Fig. 2. The framing is preferably covered to insure the exclusion of dust and dirt. If desired, the differential gear is on the inner ends of the two axle parts $b\ b$ at the place indicated by the letter $g$; but this is not essential as long as independent motion of the two road driving-wheels is provided for. The part of the casing $a$ corresponding to the vertical member of the letter T contains the variable-speed gear, which is indicated diagrammatically at $e$, and motion is communicated from the variable-speed gear to reversing-gear, consisting, for example, of a bevel-wheel $f$, which may gear with either of the bevel-wheels $h$ or $i$ or with neither. These bevel-wheels $h$ and $i$ are arranged to be capable of being moved together, as is well-known, in the direction of the axis of the axle $b$, and each bevel-wheel is arranged with, for example, a feather-way and a feather on the inner end of the split axle. Each or one of the bevel-wheels $h$ and $i$ is or are suitably provided with an annular groove, and there is a forked lever (indicated by the letter $k$) which is operated by means of a connecting-rod $m$ and a lever $l$ in such manner, for instance, that when the lever $l$ is moved forward the car goes ahead and when moved back the car goes backward. The variable-speed gear $e$ is operated by means of a lever $n$ and a connecting-rod $o$, and a friction-clutch from the engine to the variable-speed gear (not shown) is suitably operated by a foot-lever $p$, connecting-rod $q$, and lever $r$. These three levers—namely, that marked $p$ for communicating motion from the engine, $n$ for varying the speed, and $l$ for reversing the direction in which the car is to travel—are either pivoted to the car $s$ or to the casing $a$, all as found most convenient. The engine $t$ is suitably mounted in or bolted to the casing $a$ so that the crank-shaft is in line with the variable-speed gear. In the example shown the engine is provided with four cylinders (marked $u\ u\ u\ u$) and an inclosed crank-chamber. The engine is not necessarily provided with four cylinders, as there may be one, two, three, or more; but provided with four cylinders it can be arranged to work with very little vibration, and the fly-wheel $v$ if arranged, as shown, outside the crank-casing is the only part of the gear exposed to dust and dirt. The front part of the casing $a$ or engine $t$ is preferably suspended from the body or frame of the car $s$ by means of a double-armed lever $z$ and links $w$, for instance, which may be more or less elastic, or not. In this example the two links are made of flat steel twisted to form a helix and are slightly elastic. The steering is effected by either pivoting the whole fore-carriage, or, as shown in Figs. 1 and 2, only the front wheels $x$ are pivoted, in the ordinary manner, the position of the steering-wheels being regulated by suitable connections and a hand-wheel $y$, Fig. 1, or otherwise, as found most convenient.

As will be seen by reference to the drawings, the frame $a$ is supported upon the rear axles and must therefore partake of all the movements thereof except the revolving motion. Suppose now the rear wheels meet with some obstruction which produces shock. According to the present invention this shock will not be communicated to the vehicle-body, because the only connection between the body and the rear wheels' axle is through the flexible links $w$ and the frame $a$ and through the vehicle-springs. The flexibility of the links and the springs allows a relative movement between the rear wheels' axle with the frame $a$ and the car-body, and therefore the shock is not communicated to the latter. The transverse vibrations or shocks arising from the working of the motor or from other causes also are not communicated to the car-body, by reason of the links and springs. It is not essential for the links to be flexible, for, as will be easily understood, a certain amount of transverse movement is possible at the forward end between the frame $a$ and the car-body when rigid links are employed. If one of the rear wheels passes over an obstacle, it will be seen that the effect upon the car-body is minimized, according to this invention, for the reason that the partial rotation of that part of the framing $a$ inclosing the motor-shaft, due to the lifting of one of the rear wheels, merely causes an oscillation of the two-armed lever $z$ about its pivot, and owing to the parallel links $u$ this lever $z$ and the front end of the frame $a$ may be regarded as parallel levers, as will be best understood by reference to Fig. 3, and the framing may be said to be movable about the motor-shaft as pivot, the latter being directly beneath the pivot of the lever $z$. It will thus be seen that according to the present invention a certain amount of relative movement between the car-body and framing is possible in all directions, thereby minimizing the effect of any shock that can possibly occur.

As shown in Figs. 4, 5, and 6, the cylinders $u^3 u^4$ are mounted vertically instead of horizontally on the crank-casing of the engine, which latter is shown suspended from the body or frame of the car in the same manner as in Figs. 1, 2, and 3. In this example the casing $a^5$ is made of a somewhat different shape to that described with reference to Figs. 1 to 5, inasmuch as the hind wheel-axle proper, $b^6$, is a fixture and the road-wheels $c$ are loose thereon, motion being communicated from the split shaft or axle $b$ by means of pinions $b^7 b^7$, mounted at the outer ends of the shaft $b$, gearing with internal-toothed wheels $b^8 b^8$, one of which is fixed to each road-wheel $c$. The casing $a^5$ is formed so as to wholly cover the split shaft $b$ and to wholly or partially cover the axle $b^6$ and the gear-wheels $b^8 b^8$.

According to the foregoing constructions the various objects of the present invention are attained. The motor being situated at a point remote from the support on the driving wheels' axle, much of the vibration necessarily produced by an explosion-engine is absorbed by the framing and parts and is not transmitted to the said axle. Furthermore, according to this invention the motor-framework is capable of oscillating about the motor-shaft and also of moving forward or backward, by reason of the link connections between the car-body and rear axles and the forward end of the car-body and motor-frame, or laterally with regard to the car-body, thus substantially reducing the shock or jar arising from the running of the motor or from stopping or starting or from inequalities in the road.

In order to keep the car-body and the framing and wheels in their proper relative positions, I mount the axles thereof either in horn-plates or I connect the axles and the body of the car by means of radius bars or links, or I keep the car-body and the framing and wheels in their relative positions in any other convenient manner, and the specific form of link connection is illustrated in Fig. 7, in which springs 4 are mounted to yield to shocks, the ends of said springs being connected by links 4 to studs 5, depending from the car-body $s$, or as shown in Figs. 1 and 4. In order that the same limited longitudinal movement may take place, one end of each spring on the rear axle is fixed, while the other is slidable in suitable ways 7, Fig. 4.

Having thus described my invention, what I claim as new therein, and desire to secure by Letters Patent, is—

1. In a motor-car, the combination with the car-body, of a motor and shaft and a motor-supporting frame movable transversely and longitudinally to said car-body and also about the axis of motion of the shaft, substantially as set forth.

2. In a motor-car, the combination with the car-body, the driving-wheels and axles, of a motor-frame supported at one end movably about the axis of the motor-shaft and at the other end immovably laterally on said axles, and a motor situated in the framing remote from said axles, substantially as set forth.

3. In a motor-car, the combination with the car-body, the driving-wheels and axles, of a motor-frame supported at one end on the axles of the driving-wheels and laterally immovable thereon, yielding suspending members and means to pivotally suspend the frame at the other end, a motor and its shaft on the frame, said motor remote from the axles of the driving-wheels, and the axis of the motor-shaft being in the same vertical line with the point of pivotal suspension, substantially as set forth.

4. In a motor-car, the combination with the car-body, the driving-wheels and their axles, of a motor-frame supported at one end on the axles of the driving-wheels and more or less yielding suspension members at the other end to pivotally suspend said frame from the car-body, a motor and motor-shaft on said frame, said motor situated remote from the driving-wheels and the axis of the motor-shaft being in the same vertical line with the pivoted point of suspension, substantially as set forth.

5. In a motor-car, the combination with the car-body, the driving-wheels and axles, of a motor-frame supported at one end on the axles of the driving-wheels and immovable laterally thereon, a pivot on the car-body, a two-armed lever on said pivot, suspension-links to connect said lever with the front of said frame, a motor and shaft on the frame, said motor-shaft being in a vertical line with the pivots, substantially as set forth.

6. In a motor-car, the combination with the car-body, the driving-wheels and axles, of a frame supported at one end on the axles and immovable laterally thereon, a two-armed lever pivoted to the car-body, a motor and its shaft on said frame, flexible suspension-straps connecting the arms of said lever with the front end of said frame to permit the frame to oscillate about the axis of the motor-shaft, said motor situated at the front end of the frame, substantially as set forth.

7. In a motor-car, the combination with the car-body, the driving-wheels and axles, of a T-shaped frame, bearings for the axles of the driving-wheels in the transverse member of the frame, a motor-shaft, and a motor mounted at the extremity of the longitudinal member of the frame, supports for said extremity, whereby the said frame can oscillate about the motor-shaft and can also move relatively to the car-body, substantially as and for the purpose set forth.

In testimony whereof I have signed my name to this specification in the presence of two subscribing witnesses.

WALTER GORDON WILSON.

Witnesses:
G. F. WARREN,
V. JENSEN.